E. G. WICKERSHAM.
HYDROCARBON BURNER.
APPLICATION FILED AUG. 23, 1909.

958,344.

Patented May 17, 1910.

Witnesses:
Walter F MacGuirke.
L. Brandenburg

Inventor:
Enoch G. Wickersham.

UNITED STATES PATENT OFFICE.

ENOCH G. WICKERSHAM, OF PORTLAND, INDIANA, ASSIGNOR OF ONE-HALF TO FRANCIS M. McLAUGHLIN, OF PORTLAND, INDIANA.

HYDROCARBON-BURNER.

958,344.  Specification of Letters Patent.  Patented May 17, 1910.

Application filed August 23, 1909. Serial No. 514,318.

*To all whom it may concern:*

Be it known that I, ENOCH G. WICKERSHAM, a citizen of the United States, residing at Portland, Jay county, State of Indiana, have invented a new and useful Hydrocarbon-Burner, of which the following is a specification.

My invention relates to improvements in hydro-carbon burners in which the gas generator and burner are buttoned into a stove lid or plate; and the objects of my improvements are, first to provide a burner easily attached to any stove. Second, a burner generating its own gas, adapted to the various kinds of hydro-carbons, such as alcohol, and the products of crude oil. Third, to provide a burner in which the wearing parts are easily repaired.

Figure 1:
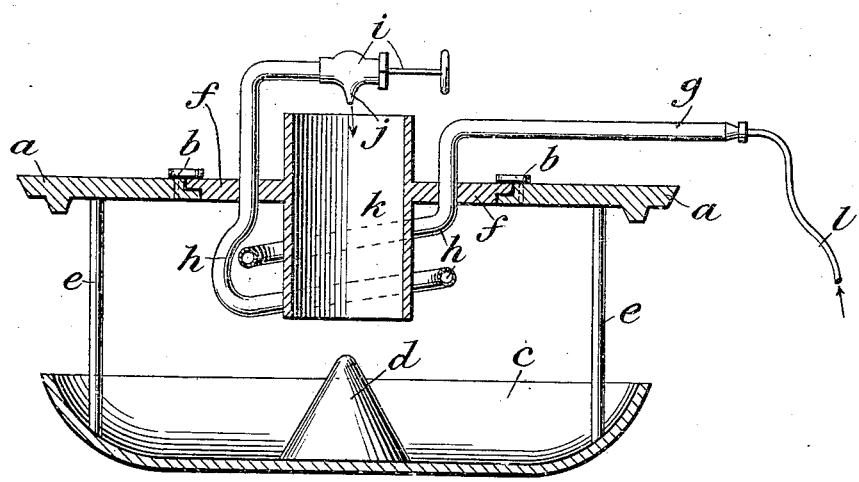
Figure 2:
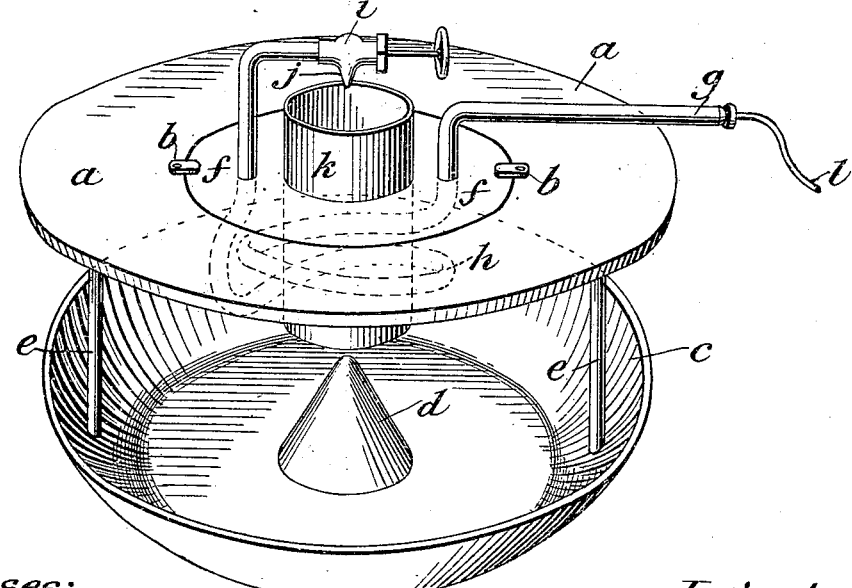

The further object of the invention is to provide a burner having the several advantages of the particular construction, arrangement and combination of parts, all as hereinafter more fully described, reference being had to the accompanying drawings, in which, Figure 1 is a substantially central vertical section of the device, and Fig. 2 is a perspective view of the same.

Similar letters refer to similar parts throughout the several views.

The stove lid rim " $a$ " takes the place of a regular stove lid. Upon this rim " $a$ " are two buttons " $b, b$," which fasten the generator into the rim. The blaze spreader and generator pan " $c$ " is hung to the rim by means of two or more bolts " $e, e$." In the center of the blaze spreader pan " $c$ " is a cone " $d$ " which acts as a gas divider, sending the blaze in all directions, the blaze and products of combustion being directed outwardly from the cone and upwardly from the concave rim of the pan. In the center of the stove lid rim " $a$ " is buttoned the burner rim " $f$ " which contains inlet pipe " $g$," generator coil " $h$ " and needle valve " $i$;" and gas jet " $j$ " which sends a jet of gas into the air mixing cylinder " $k$." The whole is fed from the tube " $l$," which is attached at the other end to the pressure tank or in some cases an elevated tank which supplies the hydro-carbon used for fuel.

In my invention I prefer to have the hydro-carbon fed from a pressure tank in which an air pressure is maintained by an air compressor.

The needle valve at the extreme end of the gas pipe enables the gas jet to be sent into the air mixer at any desired pressure. The buttons " $b, b$ " enable the burner to be taken apart for cleaning and repair without use of tools. By unscrewing the needle valve " $i$ " the burner rim " $f$ " may be slipped off the generator tube " $h$ " and the tubing cleaned or replaced.

I am aware that prior to my invention, hydro-carbon burners have been made to fit into a stove. I therefore do not claim such a combination broadly, but

I claim,

The herein-described hydro-carbon burner comprising, in combination, a stove lid rim having a central opening, a burner detachably mounted in said opening, said burner comprising an open ended vertical chamber extending above and below the plane of the rim, said chamber structure having a flange intermediate of its ends for coöperation with said rim, a generator tube passing vertically through said flange on opposite sides of said chamber, the intermediate portion of said generator tube being coiled around the lower end of the chamber, means connected to one end of the tube to feed fuel thereto, and a needle valve connected to the other end of said tube and located centrally above said chamber, and a spreader pan connected to said rim, said pan having a central cone projecting upwardly toward said chamber and needle valve and adapted to direct the flame and products of combustion outwardly and upwardly by virtue of the upturned edge of the pan, substantially as set forth.

ENOCH G. WICKERSHAM.

Witnesses:
WHITNEY E. SMITH,
ROSCOE D. WHEAT.